March 11, 1947.  J. FRASER  2,417,158
MIXING VALVE
Filed May 16, 1945  4 Sheets-Sheet 1
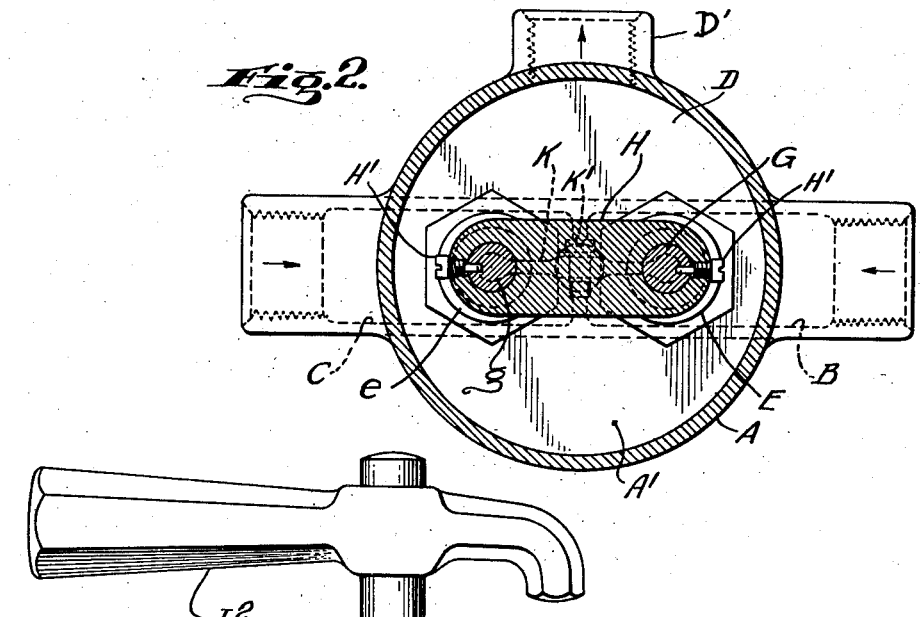
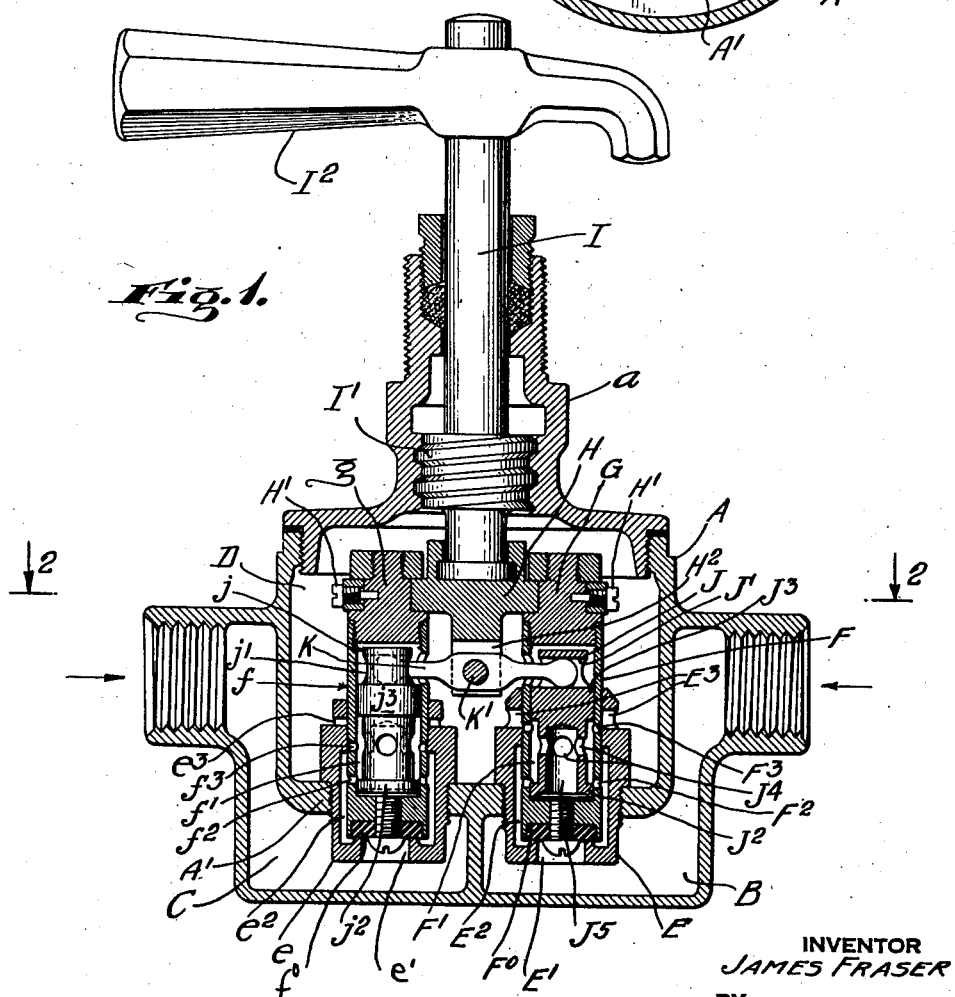
INVENTOR
JAMES FRASER
BY John E. Hubbell
ATTORNEY

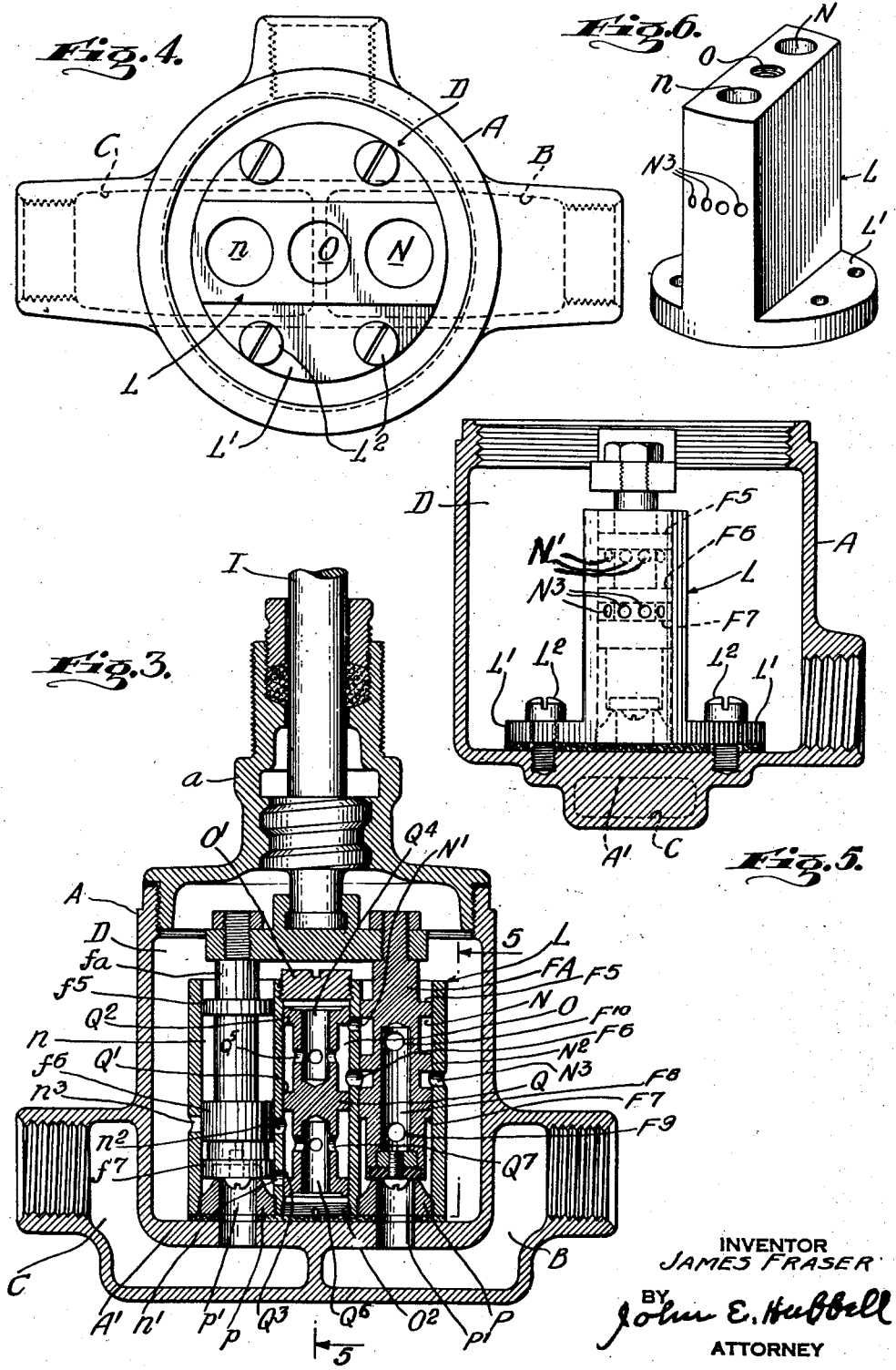

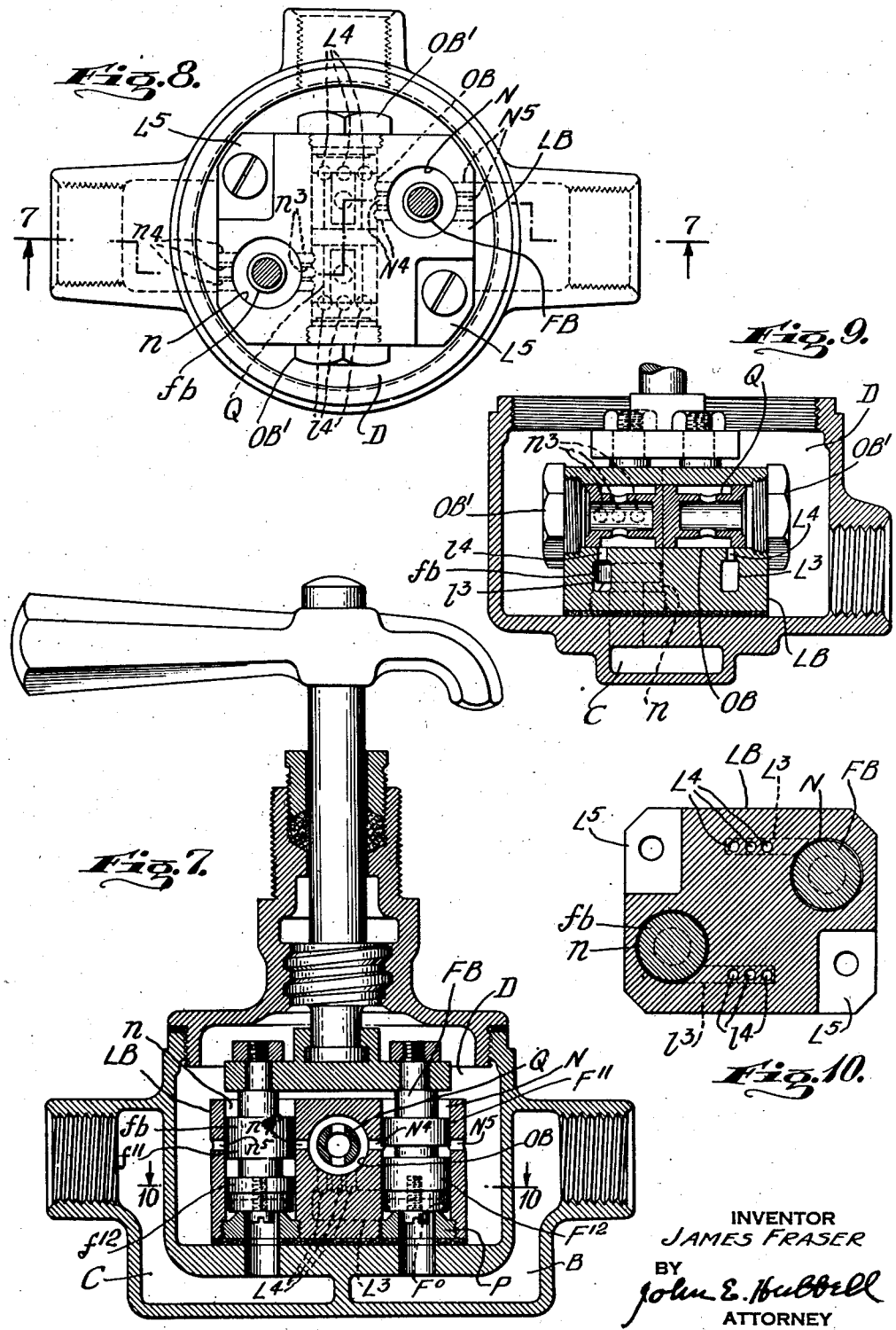

March 11, 1947.                    J. FRASER                    2,417,158
                                 MIXING VALVE
                           Filed May 16, 1945                 4 Sheets-Sheet 4
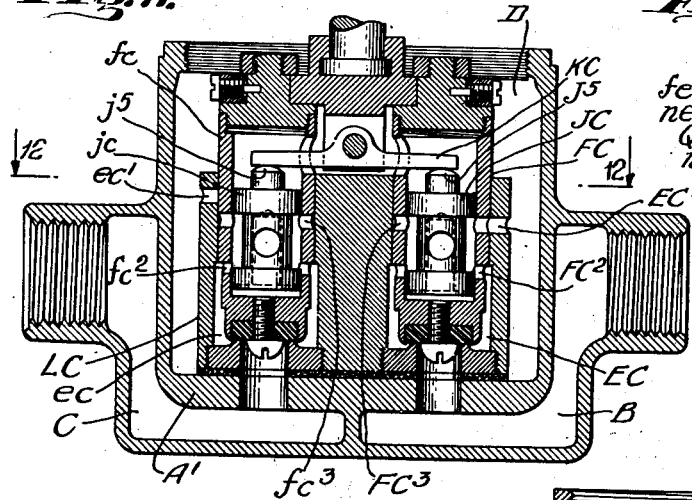
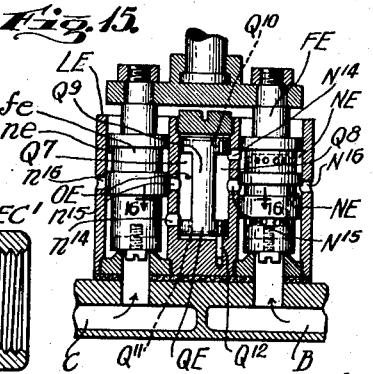
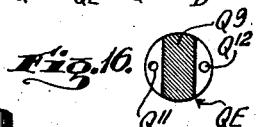
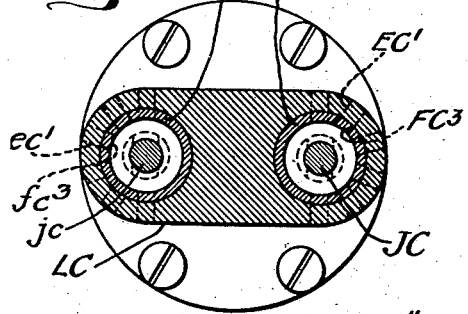
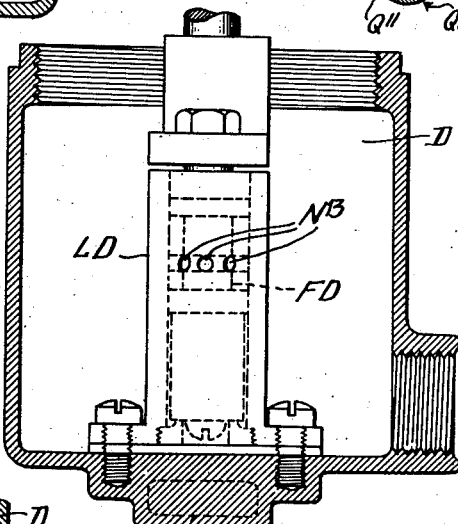
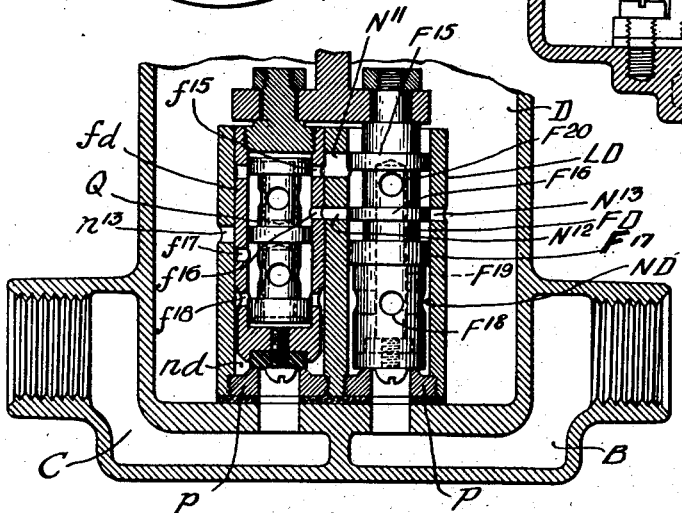
INVENTOR
JAMES FRASER
BY John E. Hubbell
ATTORNEY Patented Mar. 11, 1947

2,417,158

UNITED STATES PATENT OFFICE 2,417,158

MIXING VALVE

James Fraser, Wilmington, Del., assignor to Speakman Company, Wilmington, Del., a corporation of Delaware Application May 16, 1945, Serial No. 594,074

6 Claims. (Cl. 277—18)

My present invention consists in an improved valve for mixing two fluids and primarily devised for the purpose of providing a relatively simple and practically desirable bath or lavatory valve for mixing hot and cold water so as to deliver a mixture at a desired temperature, and including effective means which automatically prevent the discharge of water at an undesired temperature as a result of variations in the pressures at which hot and cold water are supplied to the mixing valve, and, in particular, as a result of a total or partial failure of the cold water supply pressure.

The desirability of avoiding the risk that a mixing valve will discharge unduly hot bath water and scald a bather as a result of a partial or complete failure of the cold water supply pressure has long been recognized. Heretofore, many so-called non-scalding mixing valve arrangements have been proposed, and some of those arrangements have gone into extensive use. All such prior arrangements of which I have knowledge has one or more operating or structural defects or disadvantages which it is the object of the present invention to avoid.

A specific object of the present invention is to provide a mixing valve including means for similarly proportioning the pressures at which cold and hot water are respectively supplied to separate cold and hot water valve units. The two valve units are arranged side by side and having the same characteristics. Each valve unit comprises a valve chamber with an inlet port at one end communicating with the hot or cold water supply chamber of the mixing valve, and a valve member axially movable in the valve chamber of the unit and having an end portion serving as a positive closure of the poppet valve type for the corresponding inlet port. The valve member of each valve unit also comprises a regulating valve portion for controlling the amount of the hot or cold water passing through that valve unit. The two valve units and the associated pressure balancing provisions may take various forms, some of which are illustrated and described herein by way of example.

Further specific objects of the invention are to provide a mixing valve of the character specified in which most or all of the accurate machine operations required in the construction of the valve may be simple turning and drilling operations, and in which all of the relatively movable parts are readily accessible for inspection, cleaning and repair.

The various features of novelty which characterize my invention are pointed out with particularity in the claims annexed to and forming a part of this specification. For a better understanding of the invention, however, its advantages, and specific objects attained with its use, reference should be had to the accompanying drawing and descriptive matter in which I have illustrated and described preferred embodiments of the invention.

Of the drawings:

Fig. 1 is a sectional elevation of a mixing valve embodying one form of the invention;

Fig. 2 is a section on the line 2—2 of Fig. 1;

Fig. 3 is a sectional elevation illustrating a second embodiment of the invention;

Fig. 4 is a plan view of parts of the valve mechanism shown in Fig. 3;

Fig. 5 is a section on the line 5—5 of Fig. 4;

Fig. 6 is a perspective view of a valve casing part shown in Figs. 3, 4 and 5;

Fig. 7 is a sectional elevation illustrating a third embodiment of the invention, the section being taken on the broken line 7—7 of Fig. 8;

Fig. 8 is a plan view of the mixing valve shown in Fig. 7 with parts removed;

Fig. 9 is an elevation partly in section of the apparatus parts shown in Fig. 8;

Fig. 10 is a partial section on the line 10—10 of Fig. 9;

Fig. 11 is a sectional elevation of a portion of a fourth embodiment of the invention;

Fig. 12 is a partial section on the line 12—12 of Fig. 11;

Fig. 13 is a sectional elevation of a portion of a fifth embodiment of the invention;

Fig. 14 is an elevation partly in section taken at right angles to Fig. 13;

Fig. 15 is a sectional elevation of a portion of a sixth embodiment of the invention; and Fig. 16 is a section on the line 16—16 of Fig. 15.

In Figs. 1 and 2, I have illustrated a mixing valve embodiment of my invention adapted to mix hot and cold fluids in varying proportions and in which the pressures of the fluids mixed are equalized prior to their mixture by mechanical means including separate piston and cylinder elements for each fluid and an equalizing lever through which each piston acts on the other. The casing structure of the mixing valve shown in Figs. 1 and 2, comprises a valve housing or body A formed with a cold water inlet chamber B, a hot water inlet chamber C, and a mixing outlet chamber D receiving hot and cold fluids in regulated proportions from the chambers B and C and from which the mixture formed is discharged through an outlet D'. As shown, the partition A' which separates the chamber D from the chambers B and C is formed with two side by side threaded passageways respectively receiving separable valve casing elements or chamber members E and e.

The members E and e extend through the partition A' and have lower portions in the inlet chambers B and C respectively and have upper portions in the mixing or outlet chamber D. The valve casing member E is a tubular part provided at its lower end with an internal flange portion surrounding an inlet port E' and formed at its upper side with a valve seat surrounding said port. The upper end portion of the member E has its internal diameter reduced to form a cylindrical bearing for a valve member F. The members E and F collectively form a cold water valve unit. The member F is movable axially in the casing element E toward and away from a lower closed position in which a valve washer $F^0$ secured to the lower end of the valve member engages the valve seat surrounding the upper end of the port E' and closes the latter. The valve member F comprises a tubular flow regulating portion surrounding a piston chamber F' and a solid lower end portion. The latter is recessed to receive the washer $F^0$ and has a tapped hole to receive a retaining screw for the washer.

A set of side by side inlet ports $F^2$ are formed in the wall of the chamber F', adjacent its lower end and a set of side by side outlet ports $F^3$ are formed in said wall at a higher level. The ports $F^2$ permit fluid to pass into the chamber F' from the annular space $E^2$ surrounding the lower portion of the valve member and between it and the surrounding portion of the valve casing E, which has an internal diameter greater than the external diameter of the valve member. Cold water entering the chamber F' through the ports $F^2$ passes out of the chamber F' through a set of outlet ports $F^3$ in the wall of the chamber and through a set of ports $E^3$ in the valve casing member E, when the axial adjustment of the valve F is such that the ports $F^3$ are in partial register, at least, with the ports $E^3$.

The upper end of the tubular portion of the valve member F is internally threaded to receive the threaded lower end of a connector part G through which the valve member is detachably connected to a crosshead H. The latter is vertically adjusted relative to the valve body A by the rotation of a valve spindle I mounted in a removable valve bonnet a which is detachably connected to the valve body A. A swivel connection between the valve spindle I and crosshead H is provided so that the spindle may rotate relative to the crosshead, while causing the latter to share the upward movement of the spindle in the direction of its length. The last mentioned movement is produced by the rotation of the spindle in consequence of a threaded connection between the spindle and the valve bonnet a. As shown, the parts G and H are connected, as by means of a pin H', to prevent rotative movement of the valve member F about its own axis relative to the crosshead H.

The flow of hot water from the chamber C to the chamber D is controlled by a valve unit comprising the valve chamber member e and a valve member f working in the valve chamber and having its upper end connected through a part g and pin H' to the crosshead H. The members e and f are shown as comprising portions or elements e', $e^2$, $e^3$, $f^0$, f', $f^2$ and $f^3$, corresponding to the previously mentioned ports or elements E', $E^2$, $E^3$, $F^0$, F', $F^2$ and $F^3$, respectively. It is noted, however, that the ports $f^3$ are located at a level below the level of the ports $F^3$, and that while the ports $e^3$ are advantageously of the same diameter as the ports $f^3$, the ports $E^3$ are of larger diameter than the ports $F^3$. The purpose of these port differences is hereinafter made apparent.

Pressure equalization pistons J and j, which may be duplicates of one another, are mounted in the valve chambers F' and f', respectively, and operate in conjunction with an equalization lever K to regulate the amounts of water passing into said valve chambers through their respective inlet ports $F^2$ and $f^2$, as required to equalize the water pressures in said valve chambers, notwithstanding differences between the water pressures in the chambers B and C. The lever K is pivoted intermediate its ends by a fulcrum pivot K' mounted in a depending bracket portion of the crosshead H. One end of the lever K extends through an opening formed for the purpose in the upper tubular portion of the valve F, and terminates in a globular end portion received and fitting in a diametrical passage J' in the upper end portion of the piston member J. A similar pivotal connection is provided between the opposite end of the arm K and the piston j.

The piston J comprises a lower piston valve portion $J^2$ which fits snugly in the valve chamber $F^2$ and by its longitudinal adjustment in said chamber variably throttles the inlet ports $F^2$. The valve member J also comprises an upper piston portion $J^3$ fitting snugly in the chamber F' and preventing outflow from that chamber except through the ports $F^3$. Intermediate its upper and lower piston portions, the valve member J is reduced in diameter and is formed with radial ports $J^4$ which intersect an axial passage $J^5$ in the member J. The passage $J^5$ has its upper end closed and has its lower end open to the space in the chamber F' below the piston member J. As previously noted, the piston members J and j may be identical in form.

In the closed condition of the mixing valve shown in Figs. 1 and 2, the valve washers $F^0$ and $f^0$ are in snug engagement with the valve seats surrounding the upper ends of the ports E' and e', and prevent flow through those ports. To initiate flow through the ports E' and e', the valve spindle I is rotated to raise the crosshead H and valve members F and f. This permits water flow through the port E' into the valve casing chamber $E^2$ from the chamber B, and through the port e' into the valve casing $e^2$ from the valve chamber C. The cold water flowing into the valve chamber F' through ports $F^2$, can pass freely into the mixing chamber D through ports $F^3$ and $E^3$ until the upward movement of the valve member F is sufficient to move the ports $F^3$ wholly or partly above the upper side of the ports $E^3$. The movement of valve F into, or to, the upper limit of its movement respectively interrupts or throttles flow through the ports $F^3$, so that all or most of the water then passing into and through the mixing chamber D will be hot water supplied through the chamber C and port e'.

The initial valve opening movement of the spindle I results in no flow of hot water into the mixing chamber D since the ports $f^3$ are then below the level of, and wholly out of register with, the ports $e^3$. As the rotative movement in the opening direction of the valve spindle I is continued, until the ports $F^3$ are out of full register with the ports $E^3$, the ports $f^3$ are moved into partial register with the port $e^3$. The upper range of movement of the crosshead H, in which the ports $F^3$ and $f^3$ are variably throttled may be called the regulating or mixing range of valve movement, since within that range any up or down movement of the valve members respectively increases or decreases the temperature of the water mixture formed in the outlet chamber D. The pressures in the cold and hot water supply chambers B and C are high enough to then insure the required cold water flow through the chamber F' and hot water flow through the chamber f'. The operation of the apparatus shown in Figs. 1 and 2 will be apparent from the foregoing description and explanations. As those skilled in the art will recognize, the apparatus shown in Figs. 1 and 2 is characterized by mechanical simplicity and reliability, and by the ease with which all of the relatively movable parts are rendered accessible for inspection, cleaning and repairs. The end portions of the valve members F and f adjacent the respective inlet ports E' and e' cooperate with the valve seats surrounding those ports to positively prevent water flow through each inlet port, when the valve members F and f are in their closed position.

The said side by side arrangement of the two valve members and their axial movement into engagement with the valve seats surrounding the ports E' and e' are such as to make it easy to renew the valve washers $F^0$ and $f^0$ when necessary and to avoid risk of having the proper seating of the valves interfered with by inequalities in valve washer thickness. In ordinary practise the two valve washers used will be stock parts identical in thickness.

In Figs. 3–6, inclusive, I have illustrated an embodiment of the present invention including side by side hot and cold water valve units, the valve members FA and fa of which each includes an end portion for positively closing a corresponding inlet port, also a hot or cold water proportioning portion. However, in the construction shown in Figs. 3–6, the hot and cold water proportioning and pressure equalizing provisions are quite different from those of the construction first described. The pressure equalizing provisions of Figs. 3–6 comprise a single balancing piston and valve device Q working in a chamber O separate from each of the separate valve casing chambers N and n, in which the valves FA and fa respectively work. In the desirably simple form of construction shown in Figs. 3–6 the chambers N and n are located at opposite sides of the chamber O which is coaxial with the valve spindle I, and the three chambers N, O and n are formed by drilling parallel holes in a casing element L. The latter has a flange L' at its lower end which is detachably clamped against the upper side of the partition wall A' of the housing A, as by clamping screws $L^2$ extending through the flange L' and screwed into sockets in the partition A'. The chambers N and n are internally threaded at their lower ends to receive valve seat members $P^2$ and $p^2$. The latter are formed with central inlet ports P and p coaxial with the chambers N and n, respectively, and each in register with and forming an extension of the partition wall A', the last mentioned port opening at its lower end into one or the other of the respective cold and hot water supply chambers B and C.

The valve member FA comprises three longitudinally displaced cylindrical or piston sections $F^5$, $F^6$ and $F^7$, which fit snugly in the chamber N, and portions of reduced cross-section which connect said cylindrical sections. The member FA is formed with an axial passage $F^8$ in its lower portion and with lateral ports $F^9$ and $F^{10}$ which intersect the passage $F^8$. Through the ports $F^9$ the passage $F^8$ is in communication with the free space in the chamber N below the piston section $F^7$, and through the ports $F^{10}$ the passage $F^8$ communicates with the annular portion of the chamber N between the piston sections $F^5$ and $F^6$.

When the valve FA is raised the cold water then permitted to pass upward through the port P' passes successively through the ports $F^9$, the passage $F^8$ and the ports $F^{10}$ and thence into the chamber O through ports N'. The ports N' connect the upper portion of the chamber O to a portion of the chamber N which is between the piston sections $F^5$ and $F^6$ in all working adjustment positions of the valve member FA. Ports $N^2$ and $N^3$ are formed in the wall of the chamber N at opposite sides of the chamber and at the same level so as to be throttled progressively and eventually closed by the piston portion $F^7$ of the valve member FA, as the latter is moved from its lower closed position into its uppermost working position. Except when prevented by the piston section $F^7$, water entering the upper portion of the chamber O through the ports N', may pass from the chamber O through the ports $N^2$ into the portion of the valve chamber N between the piston sections $F^6$ and $F^7$ of valve FA, and thence into the mixing chamber D through ports $N^3$.

The valve fa comprises cylindrical or piston sections $f^5$, $f^6$ and $f^7$ which fit snugly in the chamber n but differ in form and spacing from the sections $F^5$, $F^6$ and $F^7$ of the valve FA. The piston section $f^6$ cooperates with ports $n^2$ and $n^3$ at opposite sides of the chamber n, to permit hot water to flow into the mixing chamber D through the chamber n from the lower portion of the chamber O, after an appreciable initial opening movement of the valve member and at a rate increasing with the opening movement of the valve. The water passing through the ports $n^2$ into the chamber n from the chamber O enters the latter through bottom ports n'. The lower portion of the chamber n is in communication with the lower portion of the chamber O through the ports n' in all positions of the valve member fa. The piston section $f^7$ prevents the passage of hot water from the lower end of the chamber n directly upward into the portion of said chamber with which the ports $n^2$ and $n^3$ communicate.

A balancing piston valve element Q in the chamber O comprises an intermediate piston section Q' which is below the level of the ports $N^2$ and $N^3$ and above the level of the ports $n^2$ and $n^3$, in all positions of the member Q. The section Q' prevents the mixture in said chamber of the cold and hot water entering the chamber through the ports N' and n', respectively. The member Q also comprises piston section portions $Q^2$ and $Q^3$ at the upper and lower ends of member Q, respectively, which variably throttle the ports N' and n' as required to maintain substantially equal water pressures in the upper and lower portions of the chamber O, notwithstanding substantial and variable differences between the water pressures in the inlet chambers B and C.

As shown, the upper and lower ends of the chamber O are normally closed by plugs O' and $O^2$ screwed into the corresponding ends of said chamber. To insure the downward action of the cold water supply pressure on the member Q for the full cross-section of the chamber O, an axial chamber $Q^4$ open at its upper end, is formed in the upper portion of the member Q. Radial ports $Q^5$ communicating at their inner ends with the chamber $Q^4$, are formed in the reduced diameter portion of the member Q between its piston portions $Q'$ and $Q^2$. Similarly, the hot water supply pressure is adapted to subject the member Q to a lifting force over an area equal to the cross-sectional area of the chamber O by the provision of an axial chamber $Q^6$ and radial ports $Q^7$ in the lower portion of the member Q. The chamber $Q^6$ is open at its lower end and the radial ports $Q^7$ are formed in the reduced portion of the member Q between the piston sections $Q^2$ and $Q^3$ and communicate at their inner ends with the passage chamber $Q^6$.

In the construction of the valve units shown in Figs. 3–6, the only machining operations required in the formation of the valve units are turning, drilling and threading operations, unless and except, as it may be desirable to give a facing cut to the lower end of the member L and its flange $L'$. In forming the valve chamber N the aligned ports $N^2$ and $N^3$ may be formed in a single drilling operation. Ordinarily, in forming a port $N'$ a hole in register with that port is first drilled through the wall of the chamber N formed by the adjacent exposed edge of the block L. After the port $N'$ is drilled the first formed hole in register therewith is plugged as indicated at $N^0$ in Fig. 5. A similar procedure is followed in forming the ports $n^1$.

As will be apparent, the general operation of the form of the invention shown in Figs. 3–6, is the same as that of the form shown in Figs. 1–2. In each of those two forms of the invention, the flow of water to the mixing chamber D from each of the hot and cold water supply chambers B and C is controlled by an individual valve unit which comprises a valve member closing the port through which the valve unit receives water from the supply chamber with a positive, poppet valve action. In consequence, there is no need to provide check valves, such as are included in some mixing valves now in use, to avoid risk of leakage from one supply chamber into another in the closed condition of the mixing valve, no matter how much the pressure in one supply chamber may exceed that in the other.

In each of the two forms of the invention already described, each of the valve members of the two valve units comprises in addition to the poppet-like valve formed by its lower end portion, a regulating or proportioning valve portion comprising a water space communicating with the mixing chamber through a port variably throttled by the valve member in accordance with the axial adjustment of the latter. Both forms of the invention shown in Figs. 1–6 are generically alike also, in that each form includes an automatic pressure balancing arrangement automatically insuring equal, or properly proportioned, pressures in the fluid spaces of the valve members of the hot and cold valve units. Notwithstanding their specific differences, both forms of the invention already described have the same general advantage of accessibility, and the same general capacity for accurate construction by relatively simple machining operations, and for easy and accurate rewashing.

The general characteristics and advantages of the embodiments of invention shown in Figs. 1–6, are obtainable with other embodiments, and in Figs. 7–16 I have illustrated by way of example four embodiments of the invention, each differing from one another and from the two embodiments shown in Figs. 1–6. The embodiment of the invention shown in Figs. 7–10 is like the embodiment shown in Figs. 3–6 in that the pressure equalizing provisions comprise a single balancing piston and valve member Q, working in a chamber OB located between valve chambers N and $n$ formed in a block LB generally like, but differing slightly from the block L of Figs. 3–6. The chamber OB of Figs. 7–9 has its axis transverse to the axes of the cylinders N and $n$ and this permits of the use of valve members FB and $fb$ in the valve chambers N and $n$ which are somewhat simpler in form than the valve members FA and $fa$ of Figs. 3–6. As shown each end of chamber OB is closed by a removable screw plug $OB'$.

The valve member FB comprises upper and lower piston sections $F^{11}$ and $F^{12}$ connected by a portion of reduced diameter surrounded by an annular water space. The valve washer $F^0$ is secured in a lower portion of valve member FB somewhat smaller in diameter than the chamber N. In consequence, the initial opening adjustment of the valve seat member FB permits water to pass freely through the ported valve seat member P from the chamber N into a passage $L^3$. The latter extending laterally away from the chamber N at the underside of the adjacent end portion of the chamber OB communicates with the latter through uprising branch channels $L^4$. Water passing through passages $L^3$ and $L^4$ into the chamber OB, passes from the latter to the mixing chamber D through aligned ports $N^4$ and $N^5$ connecting the annular water space between the piston sections $F^{11}$ and $F^{12}$ of the valve FB to the chamber OB and to the mixing chamber D, respectively.

The valve unit including the valve member $fb$ differs efrom the valve unit including the valve member FB essentially only in that the annular water space between the piston sections $f^{11}$ and $f^{12}$ of the valve member $fb$ is of greater axial extent than the corresponding annular water space of the valve FB, and in that the lower end of the piston section $f^{11}$ and the upper end of the piston section $f^{12}$ are lower than the corresponding ends of the piston section $F^{11}$ and $F^{12}$ of the valve member FB. The end portion of the chamber OB adjacent the valve chamber $n$ receives water from the latter through passages $l^3$ and $l^4$ which are generally similar to the passages $L^3$ and $L^4$ associated with the valve chamber N. Ports $n^4$ and $n^5$ shown as of the same diameter as and coaxial with the ports $N^4$ and $N^5$, connect the annular water space between the piston sections $f^{11}$ and $f^{12}$ with the chamber OB and D, respectively. The passages $L^3$ and $l^3$ may be formed by cores in the mold in which block LB is cast, and the passages $L^4$ and $l^4$ may be similarly formed. Alternatively, these passages, or at least the passages $L^4$ and $l^4$ may be drilled in the block LB. As shown, the block LB is formed with an opposed pair of flange portions $L^5$ through which clamping screws extend into tapped sockets in the bottom wall of the mixing chamber D.

The operation of the embodiment of the invention shown in Figs. 7–10 is substantially identical with that of the embodiment shown in Figs. 3–6. Except in the event of a total failure in the cold water supply pressure, cold water will pass from the chamber OB through the ports $N^4$ and $N^5$ into the mixing chamber D as soon as the valve member FB is moved out of its closed position. As the valve members move upward from the position at which the flow of hot water through the ports $n^3$ and $n^4$ is initiated, the passage of cold water into the mixing chamber D is progressively reduced and the passage of hot water into the chamber D is progressively increased. The member Q variably throttles passages $L^4$ and $l^4$ as required to equalize the pressures of the water passing through the ports $N^3$ and $n^3$ into the valve chambers of the hot and cold water valve units, so that the proportioning actions of the valve members FB and $fb$ are substantially independent of the ordinary fluctuations in the pressures in the supply chambers B and C.

In Figs. 11 and 12 I have illustrated an embodiment of the invention like that shown in Figs. 1 and 2, in that pressure equalization is effected by means of pistons JC and $jc$ which work in piston chambers formed in the tubular upper portions of valve members FC and $fc$ and which are mechanically interconnected by a lever KC supported as is the lever K of Figs. 1 and 2. In Figs. 11 and 12 the pistons JC and $jc$ have stem portions with rounded ends $J^5$ and $j^5$ which bear against flat underside portions of the lever KC. The pistons JC and $jc$ may be duplicates of one another, and except for their portions in engagement with the lever KC, they may be similar in form to the pistons J and $j$ of Figs. 1 and 2. The valve members FC and $fc$ of Figs. 11 and 12 may be similar in construction to valve members F and $f$ of the Figs. 1 and 2, except that the ports $FC^3$ and $fc^3$ of Figs. 11 and 12 are located at the same level and are similarly spaced from the adjacent ports $FC^2$ and $fc^2$, respectively.

In Figs. 11 and 12 the valve members FC and $fc$ do not work in separate chambered valve seat members as do the valve members F and $f$ of Figs. 1 and 2, but work in chambers EC and $ec$ which are formed in a block LC supported on and detachably secured to the partition wall A' as is the block L of Figs. 3–6. Water passes into the mixing chamber D through the chambered valve member FC when the outlet ports $FC^3$ in the latter communicate with outlet ports $EC^1$ in the wall of the chamber EC. Similarly hot water passes into the mixing chamber through the chambered valve member $fc$ when the ports $fc^3$ in the latter are in communication with the ports $ec'$ in the wall of the chamber $ec$. The ports EC' are located at a lower level than ports $ec'$ so that the flow of cold water may vary inversely with the flow of hot water into the mixing chamber D as the valve member FC and $fc$ are adjusted through the regulating range, although the ports $FC^3$ and $fc^3$ are at the same level.

The general operation of the construction shown in Figs. 11 and 12 is identical with that of the construction shown in Figs. 1 and 2. The structure shown in Figs. 11 and 12 is somewhat simpler from the construction standpoint than the structure shown in Figs. 1 and 2 and is well adapted for accuracy in construction and the avoidance of less motion.

The embodiment of the invention shown in Figs. 13 and 14 resembles the embodiment shown in Fig. 3 in that the means for equalizing the pressures in the fluid spaces of the valve members of the two valve units comprise a balancing piston and valve device Q but differs from the embodiment shown in Fig. 3 and in Fig. 7 in that the balancing member Q is mounted in the tubular portion of the hot water valve member $fd$ and not in a separate chamber. The valve $fd$ is of the type of the valve members F and $f$ of Fig. 1 rather than of the type of the valve members FA and $fa$ of Fig. 3. The cold water valve unit of Figs. 13 and 14 does not differ significantly from the cold water valve unit of Fig. 3 and comprises a valve member FD like the valve member FA of Fig. 3. The valve member FD works in a chamber ND which may be exactly like the chamber N of Fig. 3 and is formed in a block LD similar to the block L of Fig. 3. The ports $N^{11}$ and $N^{12}$ of Fig. 13 corresponding to ports N' and $N^2$ of Fig. 3. The ports $N^{11}$ connect the upper portion of the chamber ND to the upper portion of the chamber $nd$ in which the valve member $fd$ works. Cold water returning to the valve chamber ND through the ports $N^{12}$ passes to the chamber D through ports $N^{13}$.

As previously stated, valve member $fd$ is similar in form to the valve member $f$ of Fig. 1 except that it is not formed with a lateral opening to receive a lever as is the tubular portion of the valve $f$. The valve member $fd$ is formed with lateral ports $f^{15}$, $f^{16}$ and $f^{17}$. The ports $N^{11}$ are made large enough to permit the ports $f^{15}$ to be in register with the ports $N^{11}$ in all positions of the valve $fd$. The ports $f^{16}$ are in register with the ports $N^{12}$ while the position of the valve FD is such that water passing through the last mentioned ports may pass through ports $N^{13}$, and the ports $f^{17}$ are out of register with outlet ports $n^{13}$ of the valve chamber $nd$ in the closed position of the valve, but are in partial or complete register with the last mentioned ports while the valve member $fd$ is in the regulating range.

As the two valve members FD and $fd$ of Figs. 13 and 14 move out of contact with the corresponding valve seat members P and $p$, cold water begins to flow into the valve chamber ND and thence through the ports $F^{18}$ and passage $F^{19}$ and ports $F^{20}$ in the valve member FD to the fluid space between the piston sections $F^{15}$ and $F^{16}$ of the valve member FD. That fluid space is at all times in communication with the ports $N^{11}$. The cold water which passes through the ports $N^{11}$ into the hollow interior of the valve $fd$ returns to the chamber ND through the ports $N^{12}$ and passes through the annular fluid space between the piston portions $F^{16}$ and $F^{17}$ of the valve member FD to the ports $N^{13}$ and thence into the outlet chamber D of the mixing valve, while the valve members $fd$ and FD are intermediate their closed positions and their positions in which only hot water is passed into the chamber D. The hot water passes from the chamber $nd$ through ports $f^{18}$ into the chamber in the member $fd$ in which the member Q works. The water entering the valve member $fd$ through the ports $f^{18}$ does not pass to the mixing chamber until movement of the valve member $fd$ is sufficient to bring the ports $f^{17}$ into partial register with the ports $n^{13}$. Further movement in the above direction of the valve member $fd$ moves the ports $f^{17}$ into complete register with ports $n^{13}$ and thus increases the flow of hot water to a maximum as the corresponding movement of the valve member FD reduces and finally interrupts the flow of cold water into the chamber D through the ports $N^{13}$.

Figs. 15 and 16 illustrate an embodiment of the invention differing in structure from the embodiment shown in Figs. 3–6, in that the balancing piston QE of Figs. 15 and 16 is cut away to form separate side by side hot and cold water spaces $Q^7$ and $Q^8$. As shown, those spaces are separated by a longitudinal plate-like piston portion $Q^9$ forming a partition extending diametrically across the chamber OE. The chamber OE and the cold and hot water valve chambers NE and $ne$ are formed in a block LE. The portion $Q^9$ connects the cylindrical or piston end sections of the piston member. The upper end section is formed with a port $Q^{10}$ providing communication between the cold water space $Q^8$ and the upper end portion of the piston chamber OE. The lower end portion of the balancing piston QE is formed with a passage $Q^{11}$ through which the hot water space $Q^7$ is in communication with the lower end of the chamber OE. To prevent rotation of the piston member QE about its own axis, a suitable spline connection between the piston QE and block LE is provided. In the form shown, the spline connection comprises a pin $Q^{12}$ having its axis parallel to and laterally displaced from the axis of the piston member QE, and having its ends located in socket passages formed one in the block LE and one in the lower cylindrical end section of the piston QE, the pin being anchored in one and slidingly received in the other of said passages.

The fact that the hot and cold water spaces in the piston member QE are side by side instead of being longitudinally displaced, as they are in Figs. 3–6, permits a reduction in the length of the valve members and piston member shown in Fig. 14, and a somewhat more desirable spacing of the ports in the valve and piston chamber walls. The spacing of the piston or full diameter sections of the valve members is modified, of course, to conform to the modified port spacing. As shown, the ports $N^{14}$ and $n^{14}$ through which cold and hot water pass into the chamber OE are located adjacent the upper and lower ends of that chamber and in this respect the arrangement shown in Fig. 15 does not differ from that shown in Fig. 3. As shown, however, the ports $N^{15}$ and $N^{16}$ through which water passes from the cold water space $Q^8$ to the mixing chamber D, and the ports $n^{15}$ and $n^{16}$ through which water passes from the hot water space $Q^7$ to the chamber D, are all at the same level.

In the foregoing description, the disposition of parts have been conveniently described as though each mixing valve shown were invariably in such an upright position as the valve is shown in Fig. 1. It will be understood, however, that in actual installations the movable valve members of the mixing valve may be vertical, horizontal or inclined at acute or obtuse angles to the horizontal. In installations of the most usual form, the movable valve members and spindle I are horizontal.

In each form of the invention illustrated, each of the ports E', e', N' n', etc., in the walls of one or another cylindrical chamber, is shown as one of a set of duplicate ports. As will be understood, such port duplication makes it possible to provide a relatively large aggregate port area in a relatively short longitudinal section of the corresponding chamber wall by simple drilling operations. However, such duplication of ports is not a novel or an essential characteristic of the invention.

In all forms of the invention, a slight amount of lost motion may be permitted in the connection between each of the plunger valve members and the crosshead H through which the valve members are given their axial movements. Such lost motion insures proper seating of the hot and cold water valve members against the valve seats surrounding the inlet ports at the lower ends of the valve chambers, even though there is some slight thickness difference between the valve washers $F^0$ and $f^0$. The lost motion provided for the purpose just stated need not be great enough to significantly effect the hot and cold water proportioning actions of the two valve members.

While it is important to prevent leakage out of the hot and cold water supply chambers of the mixing valve through the ports controlled by the lower end portions of the valve members when the latter are in their lower positions, it is to be noted that slight leakage between the movable valve and piston portions and surrounding chamber wall portions of the pressure equalizing and water proportioning portions of the different mixing valve structures shown are of small practical importance and that extreme accuracy in the formation of such parts is not practically essential.

While in accordance with the provisions of the statutes, I have illustrated and described the best forms of embodiment of my invention now known to me, it will be apparent to those skilled in the art that changes may be made in the form of the apparatus disclosed without departing from the spirit of my invention as set forth in the appended claims, and that in some cases certain features of my invention may be used to advantage without a corresponding use of other features.

Having now described my invention, what I claim as new and desire to secure by Letters Patent is:

1. A mixing valve comprising a casing structure having a mixing chamber, separate hot and cold fluid supply chambers, and separate side by side hot and cold fluid valve chambers, each having an inlet port at one end, said valve chambers being respectively connected to the hot and cold fluid supply chambers by their respective inlet ports, each valve chamber having an outlet port displaced longitudinally of the chamber from its said inlet port and opening into said mixing chamber, an axially movable valve member in each valve chamber having an end portion which closes and opens the said inlet port of the chamber as the valve member is moved toward and away from said port, valve operating means to which the end of each valve member remote from said inlet port is connected and which is operable to simultaneously move the two valve members axially in their respective valve chambers in the same direction away from said inlet ports to open the latter, and in the return direction to close said inlet ports, each valve member being formed intermediate its ends with a fluid space in communication with the inlet port of the corresponding valve chamber when the last mentioned valve member is out of its closed position and so disposed relative to the outlet port of the corresponding valve chamber that as the valve members are simultaneously moved in the same axial direction, communication between the said space in one valve member and the associated outlet port is reduced and communication between the said space of the other valve member and associated outlet port is increased, and pressure regulating means jointly responsive to the fluid pressures in said valve spaces and regulating the passage of fluid to each space from the corresponding inlet port, when said inlet ports are open as required to maintain said pressures in approximately constant proportion.

2. A mixing valve as specified in claim 1, in which the said fluid space in each valve member is an axially extending piston chamber with an inlet port in its wall in communication with the corresponding valve chamber inlet port when the latter is open, and in which the said pressure regulating means comprises a piston valve in the piston chamber of each valve movable to variably throttle said inlet port in the wall of said piston chamber and which is biased by the pressure of the fluid in the piston chamber for movement in the direction to reduce the flow through the last mentioned inlet port, in which and a mechanical connection between the two piston valves through which the movement of either in the direction to reduce the flow through the corresponding piston chamber inlet port moves the other piston valve in the direction to increase the flow through the inlet port of the piston chamber receiving the last mentioned piston valve.

3. A mixing valve as specified in claim 1, in which the pressure regulating means comprises a piston chamber external to said valve chambers and having separate outflow ports in its wall communicating with and supplying fluids to the fluid spaces of the two valve members and having inflow ports respectively associated with its outflow ports, means providing a path of flow to each of said inflow ports from the inlet port of the associated valve chamber, and a floating piston in said piston chamber forming a movable partition separating each outflow port and associated inflow port from the other outflow and inflow ports and comprising valve portions movable to reduce the flow through one or the other of said inflow ports and to simultaneously increase the flow through the other of said inflow ports, as required to balance the pressures at the opposite sides of said partition.

4. A mixing valve as specified in claim 1, in which the casing structure comprises a casing body in which said supply chambers and mixing chamber are formed and which is formed with a wall opening at one end of the mixing chamber and formed at the opposite end of the mixing chamber with a transverse partition wall with side by side ports one opening to the hot water supply chamber and the other to the cold water supply chamber, said casing structure also including a bonnet member removably closing said opening, and a block insertable in and removable from the mixing chamber through said opening when said bonnet member is removed and normally seated against said partition wall, the said valve chambers being formed in said block with their ends adjacent said partition to communicate with the ports therein.

5. A mixing valve as specified in claim 1, in which the casing structure comprises a casing body in which said supply chambers and mixing chamber are formed and which is formed with a wall opening at one end of the mixing chamber and formed at the opposite end of the mixing chamber with a transverse partition wall with side by side ports one opening to the hot water supply chamber and the other to the cold water supply chamber, said casing structure also including a bonnet member removably closing said opening, and a block insertable in and removable from the mixing chamber through said opening when said bonnet member is removed and normally seated against said partition wall, the said valve chambers being formed in said block with their ends adjacent said partition to communicate with the ports therein, and ported valve seat members removably secured in the ends of the valve chambers adjacent said partition wall and in register with said ports.

6. A mixing valve comprising a casing structure having a mixing chamber, separate hot and cold fluid supply chambers, and separate side by side hot and cold fluid valve chambers, each having an inlet port at one end, said valve chambers being respectively connected to the hot and cold fluid supply chambers by their respective inlet ports, each valve chamber having an outlet port displaced longitudinally of the chamber from its said inlet port and opening into said mixing chamber, axially movable hot and cold fluid valve members in said hot and cold fluid valve chambers respectively, each having an end portion which closes and opens the said inlet port of the corresponding valve chamber as the valve member is moved toward and away from said port, valve operating means to which the end of each valve member remote from said inlet port is connected and which is operable to simultaneously move the two valve members axially in their respective valve chambers in the same direction away from said inlet ports to open the latter and in the return direction to close said inlet ports, said cold fluid valve member being formed with longitudinally displaced first and second fluid spaces in communication with the inlet port and the outlet port, respectively, of said cold fluid valve chamber when the cold fluid valve member is in its open position, and the hot fluid valve member being formed with a control chamber, a control valve in said control chamber and forming a movable partition between longitudinally displaced first and second portions of said control chamber, the said first portion of said chamber being in communication with the inlet through said first space when the cold fluid valve member is in its open position and being then in communication with the outlet port of the cold fluid valve chamber through said second space, and the said second portion of said chamber being in communication with the inlet and outlet ports of the hot fluid valve chamber when the hot fluid valve member is in its open position, said valve members being disposed and arranged relative to the said outlet ports of the valve chambers in which the valve members are respectively received, so that as valve members move in their respective valve chambers toward and away from their wide open positions the cold fluid valve member subjects said outlet port of the cold water valve chamber to a throttling action tending to respectively decrease and increase the flow of cold fluid into the mixing chamber through the outlet port of the cold fluid valve chamber, and the hot fluid valve member subjects the said outlet port of the hot fluid valve chamber to a throttling action tending to respectively increase and decrease the flow of hot fluid into the mixing chamber through the outlet port of the hot fluid valve chamber, and said control valve and control chamber being arranged so that said control valve is moved by a difference in the pressures in said chamber portions to adjust the relative rates of flow through said portions and thereby eliminate said pressure difference.

JAMES FRASER.

REFERENCES CITED

The following references are of record in the file of this patent:

UNITED STATES PATENTS

| Number | Name | Date |
|---|---|---|
| 962,111 | Assman | June 21, 1910 |
| 2,277,314 | Gallagher | Mar. 24, 1942 |
| 1,508,938 | Powers | Sept. 16, 1924 |